US012517896B2

(12) United States Patent
Xu

(10) Patent No.: US 12,517,896 B2
(45) Date of Patent: Jan. 6, 2026

(54) QUESTION-ANSWERING METHOD AND APPARATUS

(71) Applicant: Beijing Volcano Engine Technology Co., Ltd., Beijing (CN)

(72) Inventor: Wenmin Xu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/960,212

(22) Filed: Nov. 26, 2024

(65) Prior Publication Data

US 2025/0190430 A1   Jun. 12, 2025

(30) Foreign Application Priority Data

Dec. 7, 2023   (CN) .......................... 202311673233.3

(51) Int. Cl.
*G06F 16/242*   (2019.01)
*G06F 16/22*    (2019.01)
*G06F 40/30*    (2020.01)

(52) U.S. Cl.
CPC ........ *G06F 16/243* (2019.01); *G06F 16/2237* (2019.01); *G06F 40/30* (2020.01)

(58) Field of Classification Search
CPC ..... G06F 16/243; G06F 16/2237; G06F 40/30
(Continued)

(56) References Cited

U.S. PATENT DOCUMENTS 7,869,998 B1 *  1/2011  Di Fabbrizio ..........  G10L 13/00
                                                    704/251
11,620,343 B2 * 4/2023  Kim ......................  G06F 18/214
                                                    707/728
(Continued)

FOREIGN PATENT DOCUMENTS

CN   110362665 A   10/2019
CN   113064972 A    7/2021
(Continued)

OTHER PUBLICATIONS

Jeon et al., "Finding Similar Questions in Large Question and Answer Archives", CIKM '05: Proceedings of the 14th ACM International Conference on Information and Knowledge Management, Oct. 31, 2005, pp. 84-90. (Year: 2005).*
(Continued)

*Primary Examiner* — Phuong Thao Cao
(74) *Attorney, Agent, or Firm* — Alleman Hall & Tuttle LLP

(57) ABSTRACT

The present application discloses a question-answering method. The method includes: acquiring a to-be-processed question sentence; determining, from a question-answering database, at least one candidate question sentence matching the to-be-processed question sentence, wherein the question-answering database includes the at least one candidate question sentence and an answer corresponding to each of the at least one candidate question sentence; determining whether semantics of the to-be-processed question sentence and semantics of the at least one candidate question sentence are same; and in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence.

17 Claims, 7 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 11,734,319 | B2* | 8/2023 | Jiang | G06N 5/00 |
| | | | | 707/769 |
| 12,182,184 | B2* | 12/2024 | Kim | G06F 18/214 |
| 12,346,366 | B2* | 7/2025 | Dicklin | G06F 16/3334 |
| 2005/0080614 | A1* | 4/2005 | Bennett | G10L 15/30 |
| | | | | 704/E15.04 |
| 2017/0140474 | A1* | 5/2017 | Tran | G06Q 10/063112 |
| 2018/0075335 | A1* | 3/2018 | Braz | G06F 16/24522 |
| 2020/0193089 | A1* | 6/2020 | Huang | G10L 15/04 |
| 2021/0182291 | A1* | 6/2021 | Yoldemir | G06F 16/3329 |
| 2021/0281549 | A1* | 9/2021 | Mossoba | H04L 63/083 |
| 2024/0070150 | A1* | 2/2024 | Nahamoo | G06F 16/3349 |
| 2024/0320251 | A1* | 9/2024 | Hemington | G06F 16/338 |
| 2024/0330341 | A1* | 10/2024 | Xie | G06F 16/3338 |
| 2024/0330343 | A1* | 10/2024 | Xie | G06F 16/3344 |
| 2025/0005057 | A1* | 1/2025 | Khosla | G06F 40/40 |
| 2025/0036878 | A1* | 1/2025 | Marwah | G06F 40/30 |
| 2025/0077509 | A1* | 3/2025 | Schindel | G06F 16/243 |

FOREIGN PATENT DOCUMENTS

| | | | | | |
|---|---|---|---|---|---|
| CN | 114218961 | A | * | 3/2022 | |
| CN | 114692647 | A | * | 7/2022 | ......... G06F 16/3329 |
| CN | 114936272 | A | * | 8/2022 | |
| CN | 116501843 | A | | 7/2023 | |
| CN | 116911312 | A | | 10/2023 | |
| CN | 116955568 | A | * | 10/2023 | ......... G06F 16/3329 |
| CN | 116992005 | A | | 11/2023 | |
| CN | 117033597 | A | * | 11/2023 | |
| CN | 113742469 | B | * | 12/2023 | ......... G06F 16/3329 |
| CN | 112800196 | B | * | 3/2024 | ......... G06F 16/3329 |
| CN | 117708294 | A | * | 3/2024 | |
| CN | 118051599 | A | * | 5/2024 | |
| CN | 118296104 | A | * | 7/2024 | |
| TW | I723988 | B | * | 4/2021 | |
| WO | WO-2019223362 | A1 | * | 11/2019 | |
| WO | WO-2020073533 | A1 | * | 4/2020 | ............ G06F 40/30 |
| WO | WO-2020135462 | A1 | * | 7/2020 | |
| WO | WO-2021150313 | A1 | * | 7/2021 | |

OTHER PUBLICATIONS

China National Intellectual Property Administration, Office Action Issued in Application No. 202311673233.3, Nov. 11, 2025, 16 pages.

* cited by examiner

Please determine whether semantics of the following 10 sentences are The same as those of the sentence "********"

1.XXXXXX
2.XXXXXX
3.XXXXXX
4.XXXXXX
5.XXXXXX
6.XXXXXX
7.XXXXXX
8.XXXXXX
9.XXXXXX
10.XXXXXX

You may determine the output format with reference to the following examples:

Example 1:
Example sentence 1: Why there is no data in my ** indicator group?
Example sentence 2: Why does my * * indicator group have no data?
Result: 1

Example 2:
Example sentence 3: Why there is no data in my ** indicator group?
Example sentence 4: What data is there in the ** indicator group?
Result: 0

Attention: The result is only output as 1 or 0, and no additional explanation information needs to be output

Fig. 3

QUESTION-ANSWERING METHOD AND APPARATUS

CROSS-REFERENCE TO RELATED APPLICATION

This application claims priority to Chinese Patent Application No. 202311673233.3, filed on Dec. 7, 2023, which is incorporated herein by reference in its entirety as a part of this application.

TECHNICAL FIELD

The present application relates to a question-answering method and apparatus.

BACKGROUND

With the development of computer technologies, some intelligent question-answering platforms have emerged. A user can ask a question on an intelligent question-answering platform. For example, the user can enter a corresponding question sentence in a question sentence entry region provided by the intelligent platform. Correspondingly, the intelligent question-answering platform can provide an answer to the question to the user.

Currently, the intelligent platform cannot understand the user's question well, and accordingly, the accuracy of the answer provided to the user is not high. Therefore, a solution is urgently needed to solve the above problems.

SUMMARY

In order to solve or at least partially solve the above technical problems, embodiments of the present application provide a question-answering method and apparatus.

According to a first aspect, an embodiment of the present application provides a question-answering method. The method includes:
  acquiring a to-be-processed question sentence;
  determining, from a question-answering database, at least one candidate question sentence matching the to-be-processed question sentence, wherein the question-answering database includes the at least one candidate question sentence and an answer corresponding to each of the at least one candidate question sentence;
  determining whether semantics of the to-be-processed question sentence and semantics of the at least one candidate question sentence are same; and
  in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence.

Optionally, the question-answering database is a vector database, the question-answering database includes a vector corresponding to each of a plurality of candidate question sentences, the plurality of candidate question sentences include the at least one candidate question sentence, and the determining, from the question-answering database, at least one candidate question sentence matching the to-be-processed question sentence includes:
  determining a vector corresponding to the to-be-processed question sentence;
  determining a vector matching degree between the vector corresponding to the to-be-processed question sentence and the vector corresponding to each of the plurality of candidate question sentences; and
  determining one or more candidate question sentences with a corresponding vector matching degree greater than a preset matching degree as the at least one candidate question sentence matching the to-be-processed question sentence.

Optionally, the determining whether semantics of the to-be-processed question sentence and semantics of the at least one candidate question sentence are same, includes:
  determining, by using a large language model, whether the semantics of the to-be-processed question sentence and the semantics of the at least one candidate question sentence are the same.

Optionally, the method further includes:
  indicating an output format of a result output by the large language model by using a prompt, wherein the result indicates whether the semantics of the to-be-processed question sentence and the semantics of each of the at least one candidate question sentence are the same.

Optionally, the prompt includes an example indicating the output format, and the example includes a first example sentence, a second example sentence, and a result indicating whether semantics of the first example sentence and the second example sentence are same.

Optionally, the at least one candidate question sentence includes a target candidate question sentence, and the target candidate question sentence and an answer corresponding to the target candidate question sentence are stored in the question-answering database in the following manner:
  receiving the target candidate question sentence entered by a user;
  determining the answer corresponding to the target candidate question sentence, and providing the answer corresponding to the target candidate question sentence to the user; and
  in response to the answer corresponding to the target candidate question sentence being approved by the user, storing the target candidate question sentence and the answer corresponding to the target candidate question sentence in the question-answering database.

Optionally, the acquiring, from the question-answering database, an answer corresponding to the candidate question sentence with the same semantics as the to-be-processed question sentence, and using the answer as an answer corresponding to the to-be-processed question sentence includes:
  acquiring, from the question-answering database, an answer corresponding to a target candidate question sentence, and using the answer as the answer corresponding to the to-be-processed question sentence, wherein the target candidate question sentence is a candidate question sentence with a highest matching degree with the to-be-processed question sentence in a plurality of candidate question sentences, and the plurality of candidate question sentences have the same semantics with the to-be-processed question sentence.

Optionally, the method further includes:
  in response to no candidate question sentence whose semantics is same as the semantics of the to-be-processed question sentence exists in the at least one candidate question sentence, acquiring an answer corresponding to the to-be-processed question sentence from a knowledge base different from the question-answering database.

According to a second aspect, an embodiment of the present application provides a question-answering apparatus. The apparatus includes:
- a first acquiring unit, configured to acquire a to-be-processed question sentence;
- a first determination unit, configured to determine, from a question-answering database, at least one candidate question sentence matching the to-be-processed question sentence, wherein the question-answering database includes the at least one candidate question sentence and an answer corresponding to each of the at least one candidate question sentence;
- a second determination unit, configured to determine whether semantics of the to-be-processed question sentence and the at least one candidate question sentence are same; and
- a second acquiring unit, configured to: in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence.

Optionally, the question-answering database is a vector database, the question-answering database includes a vector corresponding to each of a plurality of candidate question sentences, the plurality of candidate question sentences include the at least one candidate question sentence, and the first determination unit is configured to:
- determine a vector corresponding to the to-be-processed question sentence;
- determine a vector matching degree between the vector corresponding to the to-be-processed question sentence and the vector corresponding to each of the plurality of candidate question sentences; and
- determine one or more candidate question sentences with a corresponding vector matching degree greater than a preset matching degree as the at least one candidate question sentence matching the to-be-processed question sentence.

Optionally, the second determination unit is configured to:
- determine, by using a large language model, whether the semantics of the to-be-processed question sentence and the semantics of the at least one candidate question sentence are the same.

Optionally, the apparatus further includes:
- an indicating unit, configured to indicate output format of a result output by the large language model by using a prompt, wherein the result indicates whether the semantics of the to-be-processed question sentence and the semantics of each of the at least one candidate question sentence are the same.

Optionally, the prompt includes an example indicating the output format, and the example includes a first example sentence, a second example sentence, and a result indicating whether semantics of the first example sentence and semantics of the second example sentence are same.

Optionally, the at least one candidate question sentence includes a target candidate question sentence, and the target candidate question sentence and an answer corresponding to the target candidate question sentence are stored in the question-answering database in the following manner:
- receiving the target candidate question sentence entered by a user;
- determining the answer corresponding to the target candidate question sentence, and providing the answer corresponding to the target candidate question sentence to the user; and
- in response to the answer corresponding to the target candidate question sentence being approved by the user, storing the target candidate question sentence and the answer corresponding to the target candidate question sentence in the question-answering database.

Optionally, the second acquiring unit is configured to:
- acquire, from the question-answering database, an answer corresponding to a target candidate question sentence, and use the answer as the answer corresponding to the to-be-processed question sentence, wherein the target candidate question sentence is a candidate question sentence with a highest matching degree with the to-be-processed question sentence in a plurality of candidate question sentences, and the plurality of candidate question sentences have the same semantics with the to-be-processed question sentence.

Optionally, the apparatus further includes:
- a third acquiring unit, configured to: in response to no candidate question sentence whose semantics is same as the semantics of the to-be-processed question sentence exists in the at least one candidate question sentence, acquiring an answer corresponding to the to-be-processed question sentence from a knowledge base different from the question-answering database.

According to a third aspect, an embodiment of the present application provides an electronic device. The device includes a processor and a memory.

The processor is configured to execute instructions stored in the memory, to enable the device to perform the method according to any one of the first aspect and the possible implementations of the first aspect.

According to a fourth aspect, an embodiment of the present application provides a computer-readable storage medium, including instructions, wherein the instructions instruct a device to perform the method according to any one of the first aspect and the possible implementations of the first aspect.

According to a fifth aspect, an embodiment of the present application provides a computer program product which, when running on a computer, causes the computer to perform the method according to any one of the first aspect and the possible implementations of the first aspect.

BRIEF DESCRIPTION OF DRAWINGS

In order to more clearly describe the technical solutions in the embodiments of the present application or in the prior art, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 3 is a schematic diagram of a prompt according to an embodiment of the present application;

DETAILED DESCRIPTION

In order to make those skilled in the art better understand the solutions in the present application, the following clearly and completely describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

The inventors of the present application have found through research that in an intelligent question-answering scenario, a question-answering database may be constructed in advance, and the question-answering database may include a correspondence between a question sentence and an answer corresponding to the question sentence. After a user enters a certain question sentence A, a question sentence matching the question sentence A may be searched for in the question-answering database. Assuming that a question sentence B matching the question sentence A is found from the question-answering database, an answer corresponding to the question sentence B may be acquired from the question-answering database, and is used as an answer corresponding to the question sentence A.

However, in this manner, the accuracy of the answer determined for the question sentence A is not high, because the matching of the question sentence A and the question sentence B does not indicate that the semantics of the question sentence A and the semantics of the question sentence B are the same, and it is possible that the character similarity between the question sentence A and the question sentence B is relatively high.

In order to solve the above problems, an embodiment of the present application provides a question-answering method and apparatus, which can accurately determine an answer corresponding to a question sentence.

Various non-limiting implementations of the present application are described in detail below with reference to the accompanying drawings.

Figure 1:
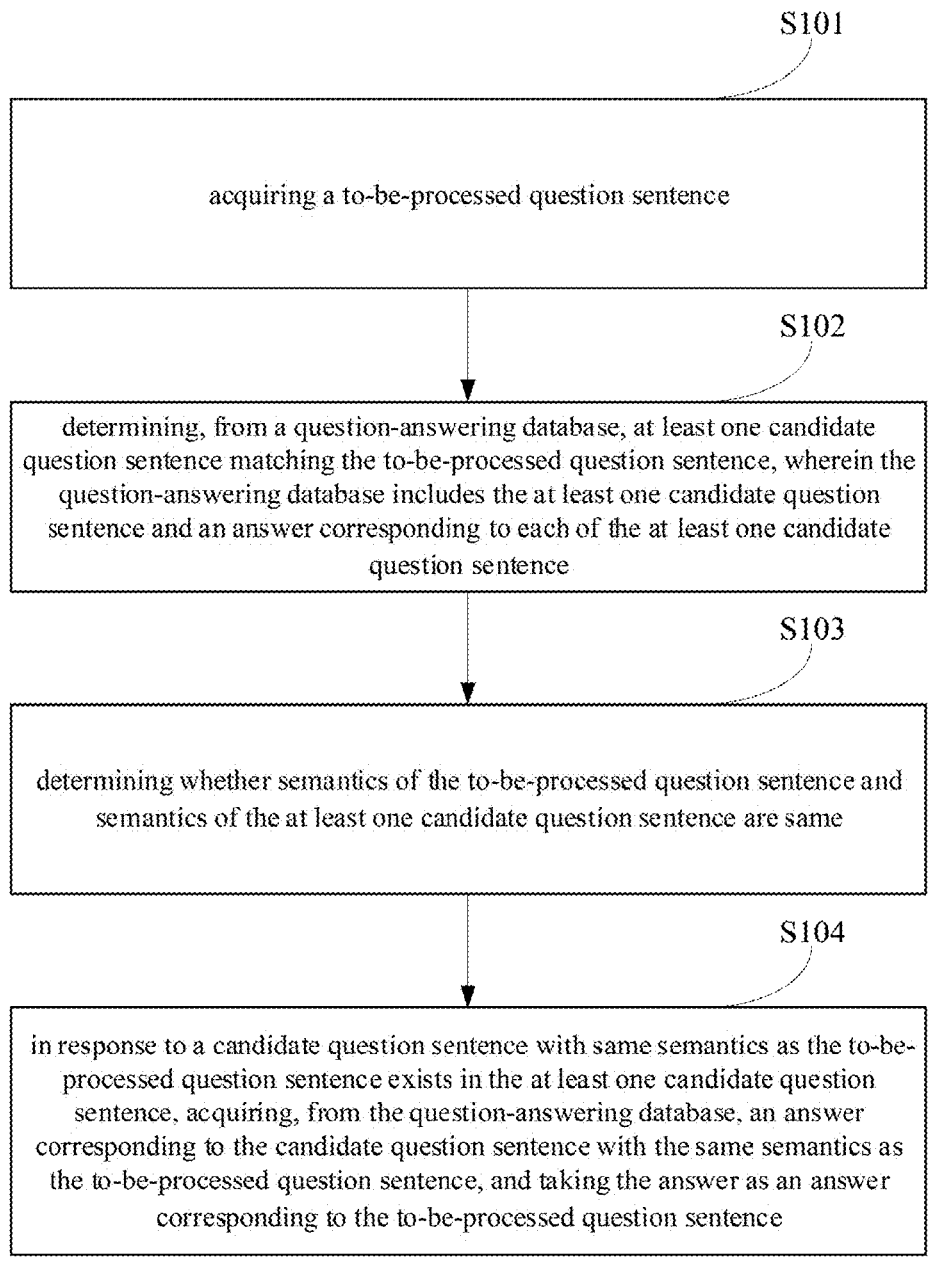
FIG. 1 is a schematic flowchart of a question-answering method according to an embodiment of the present application.

Referring to FIG. 1, FIG. 1 is a schematic flowchart of a question-answering method according to an embodiment of the present application. In an example, the method may be applied to an intelligent question-answering platform, and the intelligent question-answering platform may include, for example, an intelligent question-answering client and an intelligent question-answering server. In a specific example, the solution provided in this embodiment of the present application may be performed by the intelligent question-answering server.

An embodiment of the present application provides a question-answering method. The method may be applied to an intelligent question-answering platform. The method includes: acquiring a to-be-processed question sentence, for example, a question sentence entered by a user in a question sentence entry region provided by the intelligent question-answering platform. After the to-be-processed question sentence is acquired, an answer corresponding to the to-be-processed question sentence may be determined. In this embodiment of the present application, the answer corresponding to the to-be-processed question sentence may be determined in combination with a question-answering database. A plurality of candidate question sentences and an answer corresponding to each of the plurality of candidate question sentences are pre-stored in the question-answering database. As a specific example, at least one candidate question sentence matching the to-be-processed question sentence may be determined from the question-answering database. It is not difficult to understand that the question-answering database includes the at least one candidate question sentence and an answer corresponding to each of the at least one candidate question sentence.

In this embodiment, the method may include, for example, the following steps: S101 to S104.

S101: acquiring a to-be-processed question sentence.

In an example, the to-be-processed question sentence may be a question sentence entered by a first user in a question sentence entry region provided by the intelligent question-answering platform. In an example, the intelligent question-answering client may acquire the to-be-processed question sentence entered by the first user and send the to-be-processed question sentence to the intelligent question-answering server, and the intelligent question-answering server determines an answer for the to-be-processed question sentence.

S102: determining, from a question-answering database, at least one candidate question sentence matching the to-be-processed question sentence, wherein the question-answering database includes the at least one candidate question sentence and an answer corresponding to each of the at least one candidate question sentence.

In this embodiment of the present application, the answer for the to-be-processed question sentence may be determined with the aid of the question-answering database. The question-answering database may be constructed in advance and may include a plurality of candidate question sentences and an answer corresponding to each of the plurality of candidate question sentences.

In this embodiment of the present application, when the answer for the to-be-processed question sentence is determined by using the question-answering database, at least one candidate question sentence matching the to-be-processed question sentence may be first determined from the question-answering database.

In an example, the question-answering database may include the plurality of candidate question sentences and the answers corresponding to the plurality of candidate question sentences. In this case, character matching may be performed on the to-be-processed question sentence and the candidate question sentences in the question-answering database, to obtain the at least one candidate question sentence matching the to-be-processed question sentence.

In another example, the question-answering database may be a vector database. The vector database is a special type of database, and the vector database uses a vector model to store and process data. In the vector model, data is represented as a vector, where the vector refers to a set of ordered numerical values. An advantage of the vector database is that it can efficiently process large-scale vector data, and can quickly perform comparison and calculation between vectors, for example, calculate a distance or similarity between vectors.

When the intelligent question-answering database is the vector database, the plurality of candidate question sentences are stored in the question-answering database in a form of vectors. In other words, the question-answering database includes a vector corresponding to each of the plurality of candidate question sentences. In this case, the at least one candidate question sentence matching the to-be-processed question sentence may be determined from the question-answering database by using a vector calculation manner. As a specific example, the at least one candidate question sentence matching the to-be-processed question sentence may be determined through the following steps A1 to A3.

Step A1: determining a vector corresponding to the to-be-processed question sentence.

In this embodiment of the present application, a corresponding calculation may be performed on the to-be-processed question sentence to obtain the vector corresponding to the to-be-processed question sentence. This embodiment of the present application does not specifically limit the calculation manner of calculating the vector corresponding to the to-be-processed question sentence, and the calculation manner may use a mature calculation manner, which is not described in detail here.

Step A2: determining a vector matching degree between the vector corresponding to the to-be-processed question sentence and the vector corresponding to each of the plurality of candidate question sentences.

After the vector corresponding to the to-be-processed question sentence is determined, a vector matching degree between the vector corresponding to the to-be-processed question sentence and the vector corresponding to each of the plurality of candidate question sentences may be calculated respectively. For any two vectors, a higher vector matching degree between the two vectors indicates that the two vectors are more similar.

The vector matching degree mentioned in this embodiment of the present application may be measured by using vector similarity or vector distance.

For any two vectors (for example, the vector corresponding to the to-be-processed question sentence and the vector corresponding to a certain candidate question sentence), a higher vector similarity between the two vectors indicates a higher vector matching degree between the two vectors. When the vector matching degree is measured by using the vector similarity, the vector matching degree may be the vector similarity itself.

For any two vectors (for example, the vector corresponding to the to-be-processed question sentence and the vector corresponding to a candidate question sentence), a smaller vector distance between the two vectors indicates a higher vector matching degree between the two vectors. When the vector matching degree is measured by using the vector distance, there may be a specific mapping relationship between the vector matching degree and the vector distance.

For any two vectors, after a vector distance between the two vectors is calculated, a vector matching degree between the two vectors may be determined based on the mapping relationship.

The calculation manner of the vector similarity and the vector distance may be calculated by using a conventional calculation manner, which is not described in detail here.

Step A3: determining one or more candidate question sentences with a corresponding vector matching degree greater than a preset matching degree as the at least one candidate question sentence matching the to-be-processed question sentence.

In an example, after step A2 is performed, a vector matching degree corresponding to each candidate question sentence may be obtained. For a certain candidate question sentence, the corresponding vector matching degree refers to a vector matching degree between the corresponding vector and the vector corresponding to the to-be-processed question sentence. Then, the vector matching degrees corresponding to the candidate question sentences may be sorted from large to small, and at least one candidate question sentence that is ranked high and the value of which is greater than the preset matching degree is determined as the at least one candidate question sentence matching the to-be-processed question sentence. For a certain candidate question sentence, if the corresponding vector matching degree is higher than the preset matching degree, it indicates that the similarity between the candidate question sentence and the to-be-processed question sentence is relatively high.

This embodiment of the present application does not specifically limit the preset matching degree, and the preset matching degree may be determined based on an actual situation. For example, the preset matching degree may be 80%. For example, the vector matching degrees corresponding to the candidate question sentences may be sorted from large to small, and ten candidate question sentences that are ranked high and the values of which are greater than 80% may be determined as the at least one candidate question sentence matching the to-be-processed question sentence.

In this embodiment of the present application, it is considered that for the at least one candidate question sentence, although the at least one candidate question sentence matches the to-be-processed question sentence, it cannot be indicated that the semantics of the at least one candidate question sentence and the semantics of the to-be-processed question sentence are the same. For example, for the at least one candidate question sentence determined by using the foregoing vector calculation manner, it can only be indicated that the matching degree between the vector corresponding to the at least one candidate question sentence and the vector corresponding to the to-be-processed question sentence is relatively high, and it cannot be indicated that the semantics of the at least one candidate question sentence and the semantics of the to-be-processed question sentence are the same. Therefore, if an answer corresponding to the at least one candidate question sentence is directly read from the question-answering database and is used as the answer for the to-be-processed question sentence, the answer corresponding to the to-be-processed question sentence may not be accurate.

In order to avoid the above problem, after the at least one candidate question sentence is determined, S103 may be further performed: determining whether semantics of the to-be-processed question sentence and semantics of the at least one candidate question sentence are the same.

S103: determining whether semantics of the to-be-processed question sentence and semantics of the at least one candidate question sentence are same.

This embodiment of the present application does not specifically limit a specific implementation of S103. In an example, whether semantics of the to-be-processed question sentence and semantics of the at least one candidate question sentence are the same may be determined in a manual confirmation manner. In another example, a semantic recognition model may be pre-trained, and the semantic recognition model is used to determine whether the semantics of the to-be-processed question sentence and the semantics of the at least one candidate question sentence are the same.

In another example, whether the semantics of the to-be-processed question sentence and the semantics of the at least one candidate question sentence are the same may be determined by using a large language model. The large language model is an artificial intelligence model obtained by training a large-scale dataset and having language understanding and content generation capabilities. The objective of the large language model is to understand the meaning, grammar, and context of human language, and to be able to generate coherent text consistent with it. The foregoing large-scale dataset usually refers to massive text data.

Generally, the large language model uses a deep learning model to model and predict an input text. A training process of the deep learning model may include a pre-training stage and a fine-tuning stage. Through these two stages, the deep learning model may have higher language understanding and content generation capabilities. The pre-training stage generally uses an unsupervised learning manner to learn statistical rules and potential semantics of the language, and the fine-tuning stage further improves model performance and model adaptability through a specific supervised learning task.

This embodiment of the present application does not specifically limit the large language model, and the large language model may be any deep learning model.

Figure 2:
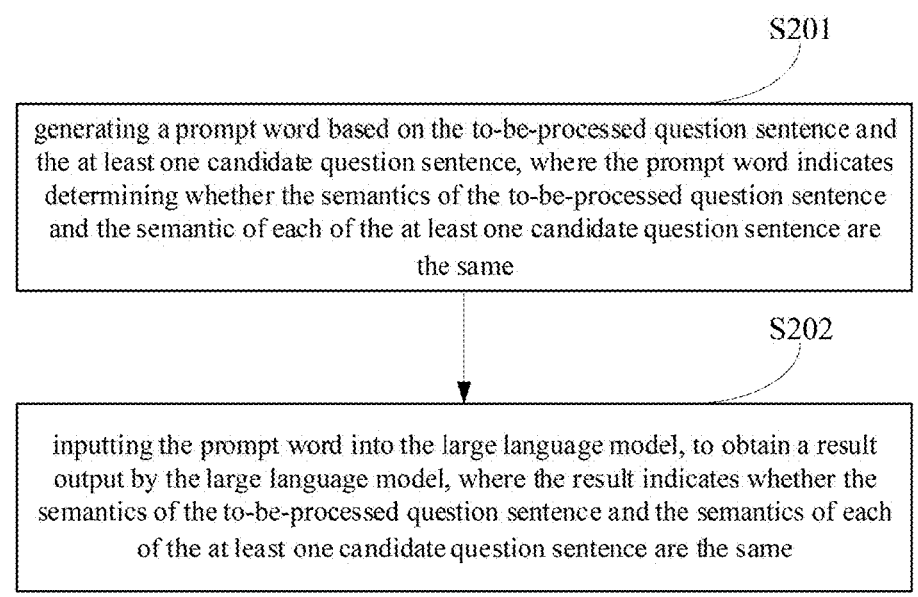
FIG. 2 is a schematic flowchart of a method for determining whether the semantics of a to-be-processed question sentence and the semantics of a candidate question sentence are the same according to an embodiment of the present application.

Specifically, when whether the semantics of the to-be-processed question sentence and the semantics of the at least one candidate question sentence are the same is determined by using the large language model, the determining may include S201 and S202 shown in FIG. 2. FIG. 2 is a schematic flowchart of a method for determining whether semantics of a to-be-processed question sentence and semantics of a candidate question sentence are same according to an embodiment of the present application.

S201: generating a prompt based on the to-be-processed question sentence and the at least one candidate question sentence, where the prompt indicates determining whether the semantics of the to-be-processed question sentence and the semantic of each of the at least one candidate question sentence are the same.

In an example, the prompt at least includes the to-be-processed question sentence and the at least one candidate question sentence, so as to indicate the large language model to determine whether the semantics of the to-be-processed question sentence and the semantics of each of the at least one candidate question sentence are the same.

S202: inputting the prompt into the large language model, to obtain a result output by the large language model, where the result indicates whether the semantics of the to-be-processed question sentence and the semantics of each of the at least one candidate question sentence are the same.

After the prompt is obtained, the prompt may be input into the large language model. After the large language model receives the prompt, the large language model may understand the prompt, and determine whether the semantics of the at least one candidate question sentence and the semantics of the to-be-processed question sentence are the same. Further, a result indicating whether the semantics of the to-be-processed question sentence and the semantics of each of the at least one candidate question sentence are the same is shown.

In an example, in addition to indicating the large language model to determine whether the semantics of the to-be-processed question sentence and the semantics of each of the at least one candidate question sentence are the same, the prompt may also be used to indicate an output format of the result output by the large language model. In this way, after determining whether the semantics of the at least one candidate question sentence and the semantics of the to-be-processed question sentence are the same, the large language model may output a corresponding result based on the format. In other words, in this embodiment of the present application, the output format of the output result of the large language model may also be indicated by using the prompt.

In this case, in an example, the prompt may further include format indication information. For example, the format indication information may be: if the semantics of two sentences are the same, output 1; and if the semantics of two sentences are different, output 0, and no additional explanation information needs to be output.

In another example, the prompt may include an example indicating the output format, and the example includes a first example sentence, a second example sentence, and a result indicating whether semantics of the first example sentence and semantics of the second example sentence are the same. In a specific example, the prompt may include a plurality of examples indicating the output format, and each example includes a corresponding first example sentence, a second example sentence, and a result indicating whether semantics of the first example sentence and semantics of the second example sentence are the same. The plurality of examples may include an example in which the semantics of the first example sentence and the semantics of the second example sentence are the same, and one example in which the semantics of the first example sentence and the semantics of the second example sentence are different. By understanding the example, the large language model may determine a format of the foregoing result. Certainly, in addition to the example, the prompt may further include other prompt information indicating the output format, which is not specifically limited in this embodiment of the present application.

The prompt may be understood with reference to FIG. 3. FIG. 3 is a schematic diagram of a prompt according to an embodiment of the present application.

As shown in FIG. 3, the prompt includes a to-be-processed prompt sentence "*****" and 10 candidate question sentences. The content of the 10 candidate question sentences is represented by "XXX". In addition, the prompt further includes two examples (namely, Example 1 and Example 2) and prompt information "The result is only output as 1 or 0, and no additional explanation information needs to be output".

S104: in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence.

If a candidate question sentence whose semantics is the same as that of the to-be-processed candidate question sentence exists in the at least one candidate question sentence, it indicates that there is a candidate question sentence in the at least one candidate question sentence that asks the same question as the to-be-processed candidate question sentence. For the at least one candidate question sentence, the question-answering database includes an answer corresponding to each of the at least one candidate question sentence. Therefore, an answer corresponding to the candidate question sentence whose semantics is same as that of the to-be-processed question sentence may be acquired from the question-answering database, and is used as the answer corresponding to the to-be-processed question sentence.

In an example, if one or more candidate question sentences whose semantics are the same as that of the to-be-processed question sentence exist in the at least one candidate question sentence, an answer corresponding to the one or more candidate question sentences whose semantics are same as that of the to-be-processed question sentence may be acquired from the question-answering database, and is used as the answer corresponding to the to-be-processed question sentence. For example, if the at least one candidate question sentence includes three candidate question sentences whose semantics are same as that of the to-be-processed question sentence, answers to the three candidate question sentences may be acquired from the question-answering database and are used as the answer to the to-be-processed question sentence.

In another example, if there are a plurality of candidate question sentences whose semantics are the same as that of the to-be-processed question sentence in the at least one candidate question sentence, in order to avoid disturbing the user by providing a plurality of answers to the user, a target candidate question sentence with a highest matching degree with the to-be-processed question sentence may be selected from the plurality of candidate question sentences whose semantics are the same as that of the to-be-processed question sentence. Correspondingly, an answer corresponding to the target candidate question sentence is acquired from the question-answering database and is used as the answer corresponding to the to-be-processed question sentence. In this case, when there are a plurality of candidate question sentences whose semantics are the same as that of the to-be-processed question sentence, an answer most matching the to-be-processed question sentence may be determined.

The matching degree mentioned here may be, for example, the vector matching degree mentioned above. The vector matching degree between the to-be-processed question sentence and the candidate question sentence may be calculated based on a vector corresponding to the to-be-processed question sentence and a vector corresponding to the candidate question sentence. For a specific calculation manner, refer to the relevant description above, and details are not described herein again.

It can be learned from the foregoing description that in this embodiment of the present application, in order to ensure the accuracy of the answer determined for the to-be-processed question sentence, after the at least one candidate question sentence is determined, it may be further determined whether the semantics of the to-be-processed question sentence and the semantics of the at least one candidate question sentence are the same. If a candidate question sentence whose semantics is the same as that of the to-be-processed question sentence exists in the at least one candidate question sentence, it indicates that the candidate question sentence whose semantics is the same as that of the to-be-processed question sentence and the to-be-processed question sentence are actually asking the same question. Therefore, an answer corresponding to the candidate question sentence whose semantics is the same as that of the to-be-processed question sentence may be acquired from the question-answering database and is used as the answer corresponding to the to-be-processed question sentence. It can be seen that with the solution in the embodiments of the present application, the to-be-processed question sentence can be better understood, and accordingly, the answer corresponding to the to-be-processed question sentence can be determined more accurately.

In an example, if it is determined after S103 is performed that there is no candidate question sentence whose semantics is the same as that of the to-be-processed question sentence in the at least one candidate question sentence, it indicates that the at least one candidate question sentence does not include a candidate question sentence that asks the same question as the to-be-processed question sentence. In this case, the answer corresponding to the to-be-processed question sentence cannot be determined by using the question-answering database. In this scenario, the answer corresponding to the to-be-processed question sentence may be determined by using a knowledge base different from the question-answering database, where the knowledge base reserves knowledge in at least one field, and the knowledge in the at least one field includes the answer corresponding to the to-be-processed question sentence.

In an example, a keyword may be extracted from the to-be-processed question sentence, and the answer corresponding to the to-be-processed question sentence is obtained from the knowledge base based on the extracted keyword.

In another example, the answer corresponding to the to-be-processed question sentence may also be determined by using the foregoing large language model. For example, a prompt indicating to determine the answer corresponding to the to-be-processed question sentence from the knowledge base is input into the large language model, and a result including the answer corresponding to the to-be-processed question sentence that is output by the large language model is acquired.

After the answer corresponding to the to-be-processed question sentence is determined, the answer may be output. In a specific example, the intelligent question-answering server may send the answer corresponding to the to-be-processed question sentence to the intelligent question-answering client, and the intelligent question-answering client displays the answer corresponding to the to-be-processed question sentence. Correspondingly, the user can view the answer corresponding to the to-be-processed question sentence.

As described above, the question-answering database may be constructed in advance. Next, a construction manner of the question-answering database is described by using a target candidate question sentence included in the question-answering database as an example. The target candidate question sentence may be any candidate question sentence included in the question-answering database. In a specific example, the target candidate question sentence may be one of the at least one candidate question sentence.

Figure 4:
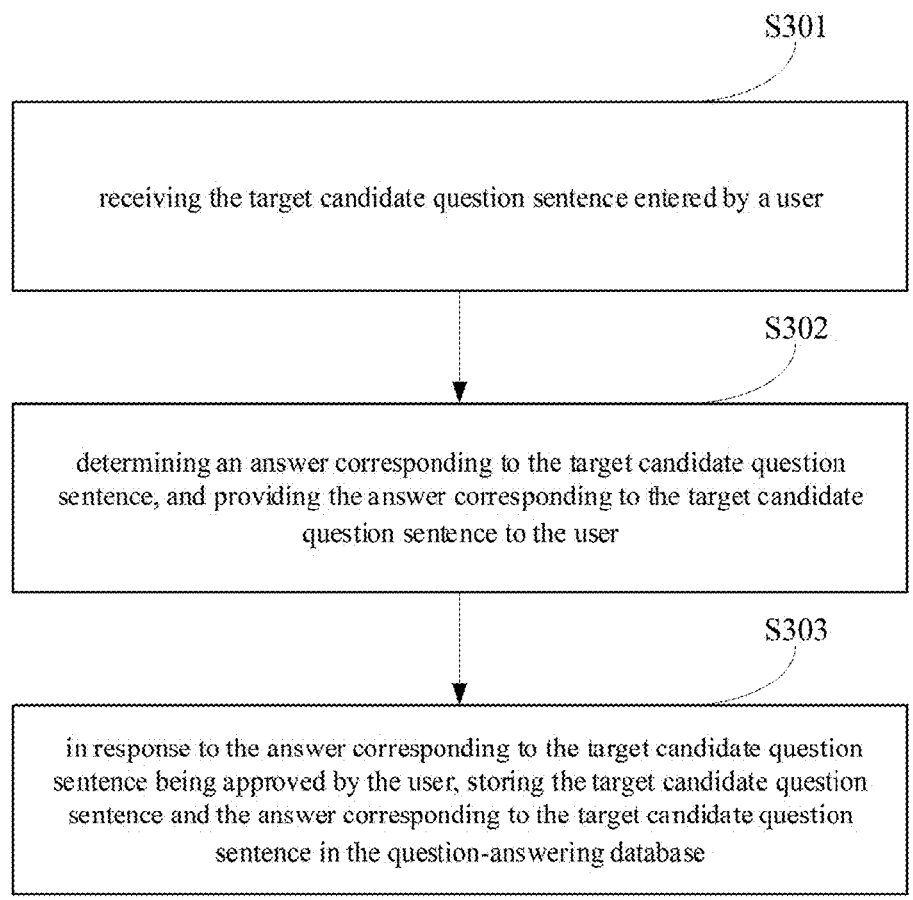
FIG. 4 is a schematic flowchart of a method for constructing a question-answering database according to an embodiment of the present application.

Referring to FIG. 4, FIG. 4 is a schematic flowchart of a method for constructing a question-answering database according to an embodiment of the present application. The method shown in FIG. 4 may include the following S301 to S303.

S301: receiving the target candidate question sentence entered by a user.

In an example, the target candidate question sentence may be a question sentence entered by a second user in a question sentence entry region provided by the intelligent question-answering platform. In an example, the intelligent question-answering client may acquire the target candidate question sentence entered by the second user, and send the target candidate question sentence to the intelligent question-answering server, and the intelligent question-answering server determines an answer for the target candidate question sentence.

The second user mentioned here and the first user who enters the to-be-processed question sentence may be a same user or different users. This embodiment of the present application is not specifically limited.

S302: determining an answer corresponding to the target candidate question sentence, and providing the answer corresponding to the target candidate question sentence to the user.

A specific implementation of determining the answer corresponding to the target candidate question sentence is similar to a specific implementation of determining an answer corresponding to the to-be-processed question sentence. Therefore, for a specific implementation of "determining an answer corresponding to the target candidate question sentence", refer to the part of the specific implementation of determining the answer corresponding to the to-be-processed question sentence above, and details are not described herein again.

After determining the answer corresponding to the target candidate question sentence, the intelligent question-answering server may provide the answer corresponding to the target candidate question sentence to the user. Specifically, the intelligent question-answering server may send the answer corresponding to the target candidate question sentence to the intelligent question-answering client, so that the intelligent question-answering client displays the answer corresponding to the target candidate question sentence.

S303: in response to the answer corresponding to the target candidate question sentence being approved by the user, storing the target candidate question sentence and the answer corresponding to the target candidate question sentence in the question-answering database.

After the intelligent question-answering client displays the answer corresponding to the target candidate question sentence, the user (the second user) can view the answer corresponding to the target candidate question sentence. In an example, the answer corresponding to the target candidate question sentence supports interaction. If the second user approves the answer corresponding to the target candidate question sentence, an approval operation may be triggered for the answer corresponding to the target candidate question sentence. The approval operation mentioned here includes but is not limited to a like operation.

Correspondingly, if the second user triggers the approval operation for the answer corresponding to the target candidate question sentence, the intelligent question-answering client may determine that the second user approves the answer corresponding to the target candidate question sentence. Further, the intelligent question-answering client may send a notification message to the intelligent question-answering server, to notify the intelligent question-answering server that the answer corresponding to the target candidate question sentence is approved by the second user. Correspondingly, the intelligent question-answering server may, in response to the answer corresponding to the target candidate question sentence being approved by the second user, store the target candidate question sentence and the answer corresponding to the target candidate question sentence in the question-answering database.

In an example, when the question-answering database is the vector database, storing the target candidate question sentence in the question-answering database may be storing a vector corresponding to the target candidate question sentence in the question-answering database.

Next, the question-answering method provided in this embodiment of the present application is described with reference to a specific scenario.

Figure 5:
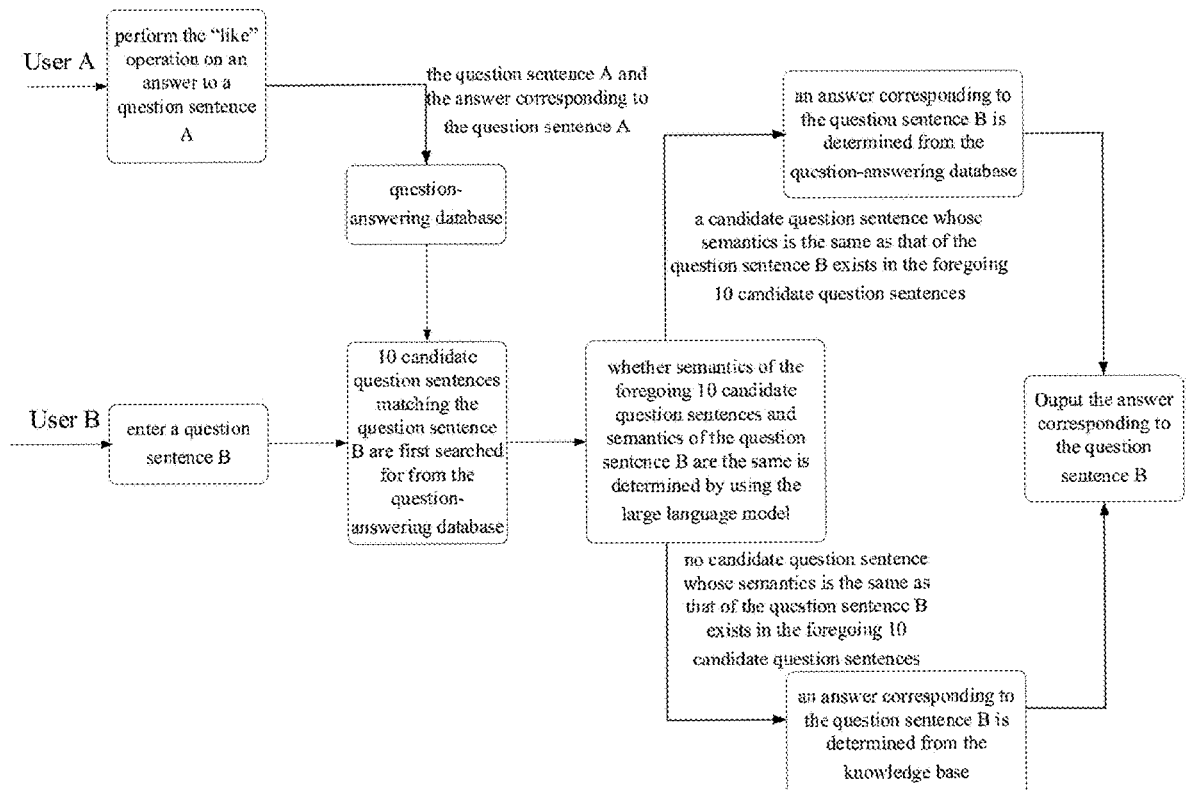
FIG. 5 is a schematic diagram of a scenario of a question-answering method according to an embodiment of the present application.

Referring to FIG. 5, FIG. 5 is a schematic diagram of a scenario of a question-answering method according to an embodiment of the present application. As shown in FIG. 5:

After the user A performs the "like" operation on an answer to a question sentence A, the question sentence A and the answer corresponding to the question sentence A are stored in the question-answering database.

The question A mentioned here may be equivalent to the target candidate question sentence mentioned above.

After the user B enters a question sentence B on the intelligent question-answering platform, 10 candidate question sentences matching the question sentence B are first searched for from the question-answering database.

The question B mentioned here may be equivalent to the to-be-processed question sentence mentioned above.

Further, whether semantics of the foregoing 10 candidate question sentences and semantics of the question sentence B are the same is determined by using the large language model.

If there is a candidate question sentence whose semantics is the same as that of the question sentence B in the foregoing 10 candidate question sentences, an answer corresponding to the question sentence B is determined from the question-answering database.

For a specific implementation of determining the answer corresponding to the question sentence B from the question-answering database, refer to the part of the description of S104 above, and details are not described herein again.

If there is no candidate question sentence whose semantics is the same as that of the question sentence B in the foregoing 10 candidate question sentences, an answer corresponding to the question sentence B is determined from the knowledge base.

For a specific implementation of determining the answer corresponding to the question sentence B from the knowledge base, refer to the part of the description of determining the answer corresponding to the to-be-processed question sentence from the knowledge base above, and details are not described herein again.

After the answer corresponding to the question sentence B is determined, the answer corresponding to the question sentence B may be output.

Based on the method provided in the foregoing embodiment, this embodiment of the present application further provides an apparatus. The apparatus is described below with reference to the accompanying drawings.

Figure 6:
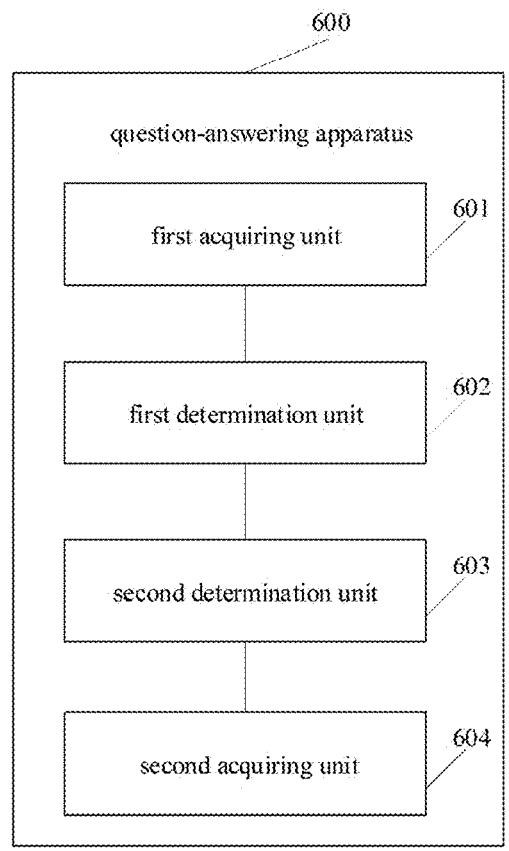
FIG. 6 is a schematic diagram of a structure of a question-answering apparatus according to an embodiment of the present application.

Referring to FIG. 6, FIG. 6 is a schematic diagram of a structure of a question-answering apparatus according to an embodiment of the present application. The apparatus 600 may specifically include, for example, a first acquiring unit 601, a first determination unit 602, a second determination unit 603, and a second acquiring unit 604.

The first acquiring unit 601 is configured to acquire a to-be-processed question sentence.

The first determination unit 602 is configured to determine, from a question-answering database, at least one candidate question sentence matching the to-be-processed question sentence, where the question-answering database includes the at least one candidate question sentence and an answer corresponding to each of the at least one candidate question sentence.

The second determination unit 603 is configured to determine whether semantics of the to-be-processed question sentence and semantics of the at least one candidate question sentence are the same.

The second acquiring unit 604 is configured to: in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence.

Optionally, the question-answering database is a vector database, the question-answering database includes a vector corresponding to each of a plurality of candidate question sentences, the plurality of candidate question sentences include the at least one candidate question sentence, and the first determination unit 602 is configured to:
  determine a vector corresponding to the to-be-processed question sentence;
  determine a vector matching degree between the vector corresponding to the to-be-processed question sentence and the vector corresponding to each of the plurality of candidate question sentences; and
  determine one or more candidate question sentences with a corresponding vector matching degree greater than a preset matching degree as the at least one candidate question sentence matching the to-be-processed question sentence.

Optionally, the second determination unit 603 is configured to:
  determine, by using a large language model, whether the semantics of the to-be-processed question sentence and the semantics of the at least one candidate question sentence are the same.

Optionally, the apparatus further includes:
an indicating unit, configured to indicate an output format of a result output by the large language model by using a prompt, wherein the result indicates whether the semantics of the to-be-processed question sentence and the semantics of each of the at least one candidate question sentence are the same.

Optionally, the prompt includes an example indicating the output format, the example including a first example sentence, a second example sentence, and a result indicating whether semantics of the first example sentence and semantics of the second example sentence are same.

Optionally, the at least one candidate question sentence includes a target candidate question sentence, and the target candidate question sentence and an answer corresponding to the target candidate question sentence are stored in the question-answering database in the following manner:
  receiving the target candidate question sentence entered by the user;
  determining the answer corresponding to the target candidate question sentence, and providing the answer corresponding to the target candidate question sentence to the user; and
  in response to the answer corresponding to the target candidate question sentence being approved by the user, storing the target candidate question sentence and the answer corresponding to the target candidate question sentence in the question-answering database.

Optionally, the second acquiring unit 604 is configured to:
acquire, from the question-answering database, an answer corresponding to a target candidate question sentence, and take the answer as the answer corresponding to the to-be-processed question sentence, wherein the target candidate question sentence is a candidate question sentence with a highest matching degree with the to-be-processed question sentence in a plurality of candidate question sentences, and the plurality of candidate question sentences have the same semantics with the to-be-processed question sentence.

Optionally, the apparatus further includes:
a third acquiring unit, configured to: in response to no candidate question sentence whose semantics is same as the semantics of the to-be-processed question sentence exists in the at least one candidate question sentence, acquiring an answer corresponding to the to-be-processed question sentence from a knowledge base different from the question-answering database.

Because the apparatus 600 is an apparatus corresponding to the question-answering method provided in the foregoing method embodiment, a specific implementation of each unit of the apparatus 600 is the same concept as that of the foregoing method embodiment. Therefore, for a specific implementation of each unit of the apparatus 600, refer to the related description of the foregoing method embodiment, and details are not described herein again.

Figure 7:
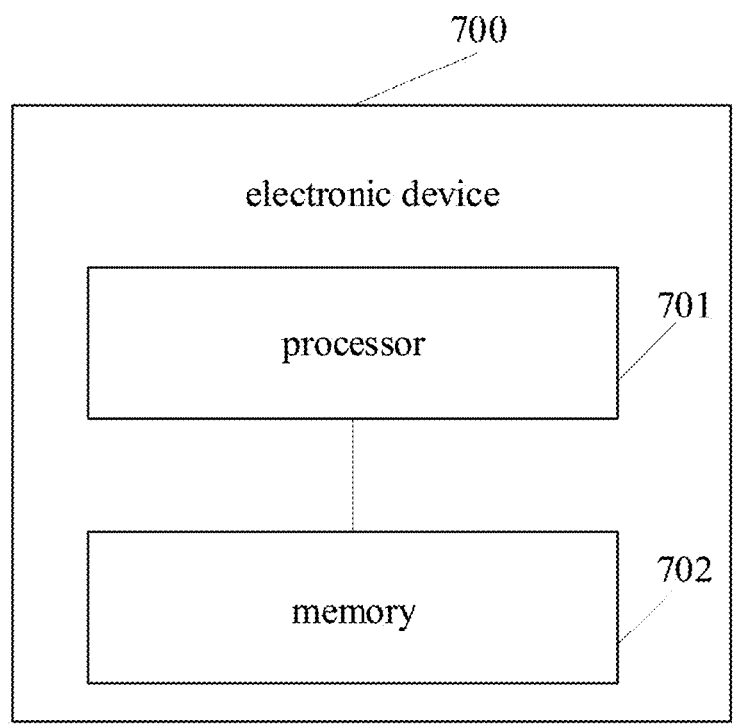
FIG. 7 is a schematic diagram of a structure of an electronic device according to an embodiment of the present application.

An embodiment of the present application further provides an electronic device. FIG. 7 is a schematic diagram of a structure of an electronic device according to an embodiment of the present application. Referring to FIG. 7, the electronic device 700 includes a processor 701 and a memory 702.

The processor 701 is configured to execute instructions stored in the memory 702, to enable the device to perform the question-answering method provided in the foregoing method embodiment.

Figure 8:
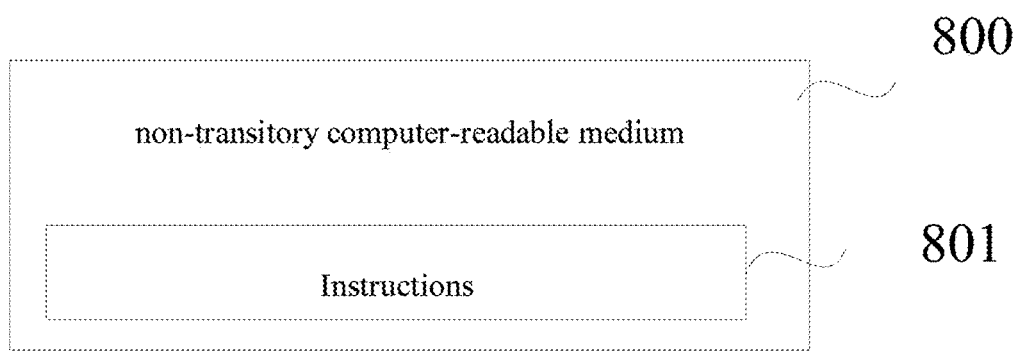
FIG. 8 is a schematic diagram of a structure of a non-transitory computer-readable medium according to an embodiment of the present application.

An embodiment of the present application provides a computer-readable storage medium. FIG. 8 is a schematic diagram of a structure of a non-transitory computer-readable medium according to an embodiment of the present application. Referring to FIG. 8, the non-transitory computer-readable medium 800 includes instructions 801, where the instructions 801 instruct a device to perform the question-answering method provided in the foregoing method embodiment.

An embodiment of the present application further provides a computer program product which, when running on a computer, causes the computer to perform the question-answering method provided in the foregoing method embodiment.

Persons skilled in the art would readily conceive of other implementations of the present application after considering the specification and practicing the invention disclosed herein. The present application is intended to cover any variations, uses, or adaptations of the present application. These variations, uses, or adaptations follow the general principles of the present application and include common knowledge or conventional technical means in the art that are not disclosed in the present disclosure. The specification and embodiments are merely considered as examples, and the true scope and spirit of the present application are defined by the following claims.

It should be understood that the present application is not limited to the precise structures that have been described above and shown in the accompanying drawings, and various modifications and changes may be made without departing from the scope thereof. The scope of the present application is limited only by the appended claims.

The foregoing descriptions are merely preferred embodiments of the present application, but are not intended to limit the present application. Any modification, equivalent replacement, or improvement made within the spirit and principle of the present application shall fall within the scope of protection of the present application.

The invention claimed is:

1. A question-answering method, comprising:
acquiring a to-be-processed question sentence;
determining, from a question-answering database, at least one candidate question sentence matching the to-be-processed question sentence, wherein the question-answering database comprises the at least one candidate question sentence and an answer corresponding to each of the at least one candidate question sentence;
determining, by using a large language model, whether semantics of the to-be-processed question sentence and semantics of the at least one candidate question sentence are same; and
in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence,
wherein the question-answering database is a vector database, and the question-answering database comprises a vector corresponding to each of a plurality of candidate question sentences, and
wherein the determining, by using a large language model, whether semantics of the to-be-processed question sentence and semantics of the at least one candidate question sentence are same comprises:
generating a prompt based on the to-be-processed question sentence and the at least one candidate question sentence, wherein the prompt indicates determining whether the semantics of the to-be-processed question sentence and the semantics of each of the at least one candidate question sentence are the same; and
inputting the prompt into the large language model, to obtain a result output by the large language model, wherein the result indicates whether the semantics of the to-be-processed question sentence and the semantics of each of the at least one candidate question sentence are the same.

2. The method according to claim 1, wherein the plurality of candidate question sentences comprise the at least one candidate question sentence, and
wherein the determining, from a question-answering database, at least one candidate question sentence matching the to-be-processed question sentence, comprises:
determining a vector corresponding to the to-be-processed question sentence;
determining a vector matching degree between the vector corresponding to the to-be-processed question sentence and the vector corresponding to each of the plurality of candidate question sentences; and
determining one or more candidate question sentences with a corresponding vector matching degree greater than a preset matching degree as the at least one candidate question sentence matching the to-be-processed question sentence.

3. The method according to claim 1, further comprising:
indicating an output format of the result output by the large language model by using a prompt, wherein the result indicates whether the semantics of the to-be-processed question sentence and the semantics of each of the at least one candidate question sentence are the same.

4. The method according to claim 3, wherein the prompt comprises an example indicating the output format, and the example comprises a first example sentence, a second example sentence, and a result indicating whether semantics of the first example sentence and semantics of the second example sentence are same.

5. The method according to claim 1, wherein the at least one candidate question sentence comprises a target candidate question sentence, and the target candidate question sentence and an answer corresponding to the target candidate question sentence are stored in the question-answering database in following manner:
receiving the target candidate question sentence entered by a user;
determining the answer corresponding to the target candidate question sentence, and providing the answer corresponding to the target candidate question sentence to the user; and
in response to the answer corresponding to the target candidate question sentence being approved by the user, storing the target candidate question sentence and the answer corresponding to the target candidate question sentence in the question-answering database.

6. The method according to claim 1, wherein the acquiring, from the question-answering database, an answer corresponding to the candidate question sentence with the same semantics as the to-be-processed question sentence, and taking the answer as an answer corresponding to the to-be-processed question sentence, comprises:
acquiring, from the question-answering database, an answer corresponding to a target candidate question sentence, and taking the answer as the answer corresponding to the to-be-processed question sentence, wherein the target candidate question sentence is a candidate question sentence with a highest matching degree with the to-be-processed question sentence in the plurality of candidate question sentences, and the plurality of candidate question sentences have the same semantics with the to-be-processed question sentence.

7. The method according to claim 1, further comprising:
in response to no candidate question sentence whose semantics is same as the semantics of the to-be-processed question sentence exists in the at least one candidate question sentence, acquiring an answer corresponding to the to-be-processed question sentence from a knowledge base different from the question-answering database.

8. An electronic device, comprising a processor and a memory, wherein
the processor is configured to execute instructions stored in the memory, to enable the electronic device to perform a question-answering method, wherein the question-answering method comprises:
acquiring a to-be-processed question sentence;
determining, from a question-answering database, at least one candidate question sentence matching the to-be-processed question sentence, wherein the question-answering database comprises the at least one candidate question sentence and an answer corresponding to each of the at least one candidate question sentence;
determining, by using a large language model, whether semantics of the to-be-processed question sentence and semantics of the at least one candidate question sentence are same; and
in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence,
wherein the question-answering database is a vector database, the question-answering database comprises a vector corresponding to each of a plurality of candidate question sentences, and
wherein the determining, by using a large language model, whether semantics of the to-be-processed question sentence and semantics of the at least one candidate question sentence are same comprises:
generating a prompt based on the to-be-processed question sentence and the at least one candidate question sentence, wherein the prompt indicates determining whether the semantics of the to-be-processed question sentence and the semantics of each of the at least one candidate question sentence are the same; and
inputting the prompt into the large language model, to obtain a result output by the large language model, wherein the result indicates whether the semantics of the to-be-processed question sentence and the semantics of each of the at least one candidate question sentence are the same.

9. The electronic device according to claim 8, wherein the plurality of candidate question sentences comprise the at least one candidate question sentence, and
wherein the determining, from a question-answering database, at least one candidate question sentence matching the to-be-processed question sentence, comprises:
determining a vector corresponding to the to-be-processed question sentence;
determining a vector matching degree between the vector corresponding to the to-be-processed question sentence and the vector corresponding to each of the plurality of candidate question sentences; and
determining one or more candidate question sentences with a corresponding vector matching degree greater than a preset matching degree as the at least one candidate question sentence matching the to-be-processed question sentence.

10. The electronic device according to claim 8, wherein the question-answering method comprises:
indicating an output format of the result output by the large language model by using a prompt, wherein the result indicates whether the semantics of the to-be-processed question sentence and the semantics of each of the at least one candidate question sentence are the same.

11. The electronic device according to claim 10, wherein the prompt comprises an example indicating the output format, and the example comprises a first example sentence, a second example sentence, and a result indicating whether semantics of the first example sentence and semantics of the second example sentence are same.

12. The electronic device according to claim 8, wherein the at least one candidate question sentence comprises a target candidate question sentence, and the target candidate question sentence and an answer corresponding to the target candidate question sentence are stored in the question-answering database in following manner:
receiving the target candidate question sentence entered by a user;
determining the answer corresponding to the target candidate question sentence, and providing the answer corresponding to the target candidate question sentence to the user; and
in response to the answer corresponding to the target candidate question sentence being approved by the user, storing the target candidate question sentence and the answer corresponding to the target candidate question sentence in the question-answering database.

13. The electronic device according to claim 8, wherein the acquiring, from the question-answering database, an answer corresponding to the candidate question sentence with the same semantics as the to-be-processed question sentence, and taking the answer as an answer corresponding to the to-be-processed question sentence, comprises:
acquiring, from the question-answering database, an answer corresponding to a target candidate question sentence, and taking the answer as the answer corresponding to the to-be-processed question sentence, wherein the target candidate question sentence is a candidate question sentence with a highest matching degree with the to-be-processed question sentence in the plurality of candidate question sentences, and the plurality of candidate question sentences have the same semantics with the to-be-processed question sentence.

14. The electronic device according to claim 8, wherein the question-answering method comprises:
in response to no candidate question sentence whose semantics is same as the semantics of the to-be-processed question sentence exists in the at least one candidate question sentence, acquiring an answer corresponding to the to-be-processed question sentence from a knowledge base different from the question-answering database.

15. A non-transitory computer-readable storage medium, comprising instructions, wherein the instructions instruct a device to perform a question-answering method,
wherein the question-answering method comprises:
acquiring a to-be-processed question sentence;
determining, from a question-answering database, at least one candidate question sentence matching the to-be-processed question sentence, wherein the question-answering database comprises the at least one candidate question sentence and an answer corresponding to each of the at least one candidate question sentence;
determining, by using a large language model, whether semantics of the to-be-processed question sentence and semantics of the at least one candidate question sentence are same; and
in response to a candidate question sentence with same semantics as the to-be-processed question sentence exists in the at least one candidate question sentence, acquiring, from the question-answering database, an answer corresponding to the candidate question sentence with the same semantics as the to-be-processed question sentence, and taking the answer as an answer corresponding to the to-be-processed question sentence, wherein the question-answering database is a vector database, the question-answering database comprises a vector corresponding to each of a plurality of candidate question sentences, and wherein the determining, by using a large language model, whether semantics of the to-be-processed question sentence and semantics of the at least one candidate question sentence are same comprises:
generating a prompt based on the to-be-processed question sentence and the at least one candidate question sentence, wherein the prompt indicates determining whether the semantics of the to-be-processed question sentence and the semantics of each of the at least one candidate question sentence are the same; and
inputting the prompt into the large language model, to obtain a result output by the large language model, wherein the result indicates whether the semantics of the to-be-processed question sentence and the semantics of each of the at least one candidate question sentence are the same.

16. The storage medium according to claim 15, wherein the plurality of candidate question sentences comprise the at least one candidate question sentence, and
wherein the determining, from a question-answering database, at least one candidate question sentence matching the to-be-processed question sentence, comprises:
determining a vector corresponding to the to-be-processed question sentence;
determining a vector matching degree between the vector corresponding to the to-be-processed question sentence and the vector corresponding to each of the plurality of candidate question sentences; and
determining one or more candidate question sentences with a corresponding vector matching degree greater than a preset matching degree as the at least one candidate question sentence matching the to-be-processed question sentence.

17. The storage medium according to claim 15, wherein the question-answering method further comprises:
indicating an output format of the result output by the large language model by using a prompt, wherein the result indicates whether the semantics of the to-be-processed question sentence and the semantics of each of the at least one candidate question sentence are the same.

* * * * *